US012451476B2

(12) United States Patent
Biton et al.

(10) Patent No.: US 12,451,476 B2
(45) Date of Patent: Oct. 21, 2025

(54) ELECTROCHEMICALLY PRODUCED THREE-DIMENSIONAL STRUCTURES FOR BATTERY ELECTRODES

(71) Applicant: Addionics IL Ltd, Tel Aviv-Jaffa (IL)

(72) Inventors: Moshiel Biton, Tel Aviv-Jaffa (IL); Vladimir Yufit, London (GB); Farid Tariq, London (GB)

(73) Assignee: Addionics IL Ltd., Tel Aviv-Jaffa (IL)

( * ) Notice: Subject to any disclaimer, the term of this patent is extended or adjusted under 35 U.S.C. 154(b) by 936 days.

(21) Appl. No.: 17/614,202

(22) PCT Filed: May 27, 2020

(86) PCT No.: PCT/IL2020/050581
§ 371 (c)(1),
(2) Date: Nov. 24, 2021

(87) PCT Pub. No.: WO2020/240553
PCT Pub. Date: Dec. 3, 2020

(65) Prior Publication Data
US 2022/0223829 A1    Jul. 14, 2022

(30) Foreign Application Priority Data
May 27, 2019 (IL) .......................................... 266910

(51) Int. Cl.
*H01M 10/052* (2010.01)
*H01M 4/04* (2006.01)
(Continued)

(52) U.S. Cl.
CPC ......... *H01M 4/0404* (2013.01); *H01M 4/045* (2013.01); *H01M 10/052* (2013.01);
(Continued)

(58) Field of Classification Search
CPC .... H01M 4/0404; H01M 4/045; H01M 4/808; H01M 10/052; H01M 10/0562; H01M 10/0567; H01M 2300/0068
See application file for complete search history.

(56) References Cited

U.S. PATENT DOCUMENTS

| 4,304,653 A | 12/1981 | Winand |
| 5,510,212 A | 4/1996 | Delnick et al. |

(Continued)

FOREIGN PATENT DOCUMENTS

| CN | 1590591 | 3/2005 |
| CN | 1461358 | 12/2010 |

(Continued)

OTHER PUBLICATIONS

Supplementary European Search Report and the European Search Opinion Dated May 30, 2023 From the European Patent Office Re. Application No. 20814665.4. (11 Pages).
(Continued)

*Primary Examiner* — Jane J Rhee
(74) *Attorney, Agent, or Firm* — The Roy Gross Law Firm, LLC; Roy D. Gross

(57) ABSTRACT

A continuous process for manufacturing electrical current collectors for primary and secondary batteries by electrochemical deposition, comprising i) providing a first roll and a second roll for winding a continuous electrically conductive substrate co-acting as a working electrode, wherein depending on polarity the working electrode can act as an anode or a cathode, wherein the substrate has first and second parallel sides, a first side whereat deposition or partial dissolution occur, and a second side acting as a counter electrode to close a circuit.

18 Claims, 14 Drawing Sheets

(51) Int. Cl.
  *H01M 10/0562* (2010.01)
  *H01M 10/0567* (2010.01)
  *H01M 4/80* (2006.01)

(52) U.S. Cl.
  CPC ... *H01M 10/0562* (2013.01); *H01M 10/0567* (2013.01); *H01M 4/808* (2013.01); *H01M 2300/0068* (2013.01)

(56) References Cited

U.S. PATENT DOCUMENTS

| | | | |
|---|---|---|---|
| 5,795,680 | A | 8/1998 | Ikeda et al. |
| 6,346,343 | B1 | 2/2002 | Notten et al. |
| 6,605,390 | B1 | 8/2003 | Moore et al. |
| 7,229,544 | B2 | 6/2007 | Cohen |
| 8,216,931 | B2 | 7/2012 | Zhang |
| 8,575,025 | B2 | 11/2013 | Fitzpatrick et al. |
| 8,939,774 | B2 | 1/2015 | Scholvin et al. |
| 9,178,217 | B2 | 11/2015 | Jung |
| 9,244,101 | B2 | 1/2016 | Cohen et al. |
| 9,777,385 | B2 | 10/2017 | Wirth et al. |
| 10,096,861 | B2 | 10/2018 | Joo |
| 2004/0168925 | A1 | 9/2004 | Landau |
| 2006/0163078 | A1 | 7/2006 | Peter |
| 2007/0068819 | A1 | 3/2007 | Singh et al. |
| 2007/0089993 | A1 | 4/2007 | Schwartz et al. |
| 2007/0248887 | A1 | 10/2007 | Eskra et al. |
| 2009/0324988 | A1 | 12/2009 | Moteki et al. |
| 2010/0126849 | A1 | 5/2010 | Lopatin et al. |
| 2012/0295144 | A1 | 11/2012 | Kwon et al. |
| 2014/0360882 | A1 | 12/2014 | Kim et al. |
| 2015/0251351 | A1 | 9/2015 | Feygin |
| 2017/0009360 | A1 | 1/2017 | Schuh et al. |
| 2017/0145584 | A1 | 5/2017 | Wirth et al. |
| 2017/0352868 | A1 | 12/2017 | Zhamu et al. |
| 2018/0020048 | A1 | 1/2018 | Seol et al. |

FOREIGN PATENT DOCUMENTS

| | | |
|---|---|---|
| CN | 102089908 | 6/2011 |
| CN | 102334224 | 1/2012 |
| CN | 102376959 | 3/2012 |
| CN | 103668376 | 3/2014 |
| CN | 104178782 | 12/2014 |
| CN | 104577136 | 4/2015 |
| CN | 105177670 | 12/2015 |
| CN | 108155387 | 6/2018 |
| JP | 8-120499 | 5/1996 |
| JP | 10-195689 | 7/1998 |
| JP | 2013-7069 | 1/2013 |
| WO | WO 2014/163986 A1 | 10/2014 |
| WO | 2017009368 A1 | 1/2017 |
| WO | 2019150362 A1 | 8/2019 |
| WO | WO 2020/240553 | 12/2020 |

OTHER PUBLICATIONS

Meyer et al. "Characterization of The Calendering Process for Compaction of Electrodes for Lithium-Ion Batteries", Journal of Materials Processing Technology, 249: 172-178, May 26, 2017.

Xuetian et al. "Facile and Scalable Electrodeposition of Copper Current Collectors for High-Performance Li—Metal Batteries", Nano Energy, 59: 500-507, May 1, 2019.

Zhang et al. "Influence of Modified Current Collector on Double Layer Capacitor", China Academic Journal Electronic Publishmg House, 31(7): 538-541, 2007. [Abstract].

Deng, Bing et al., "Roll-to-roll Encapsulation of Metal Nanowires Between Graphene and Plastic Substrate for High-Performance Flexible Transparent Electrodes" Nano letters 15.6, 2015, 4206-13.

Hu, Yuhai et al., "Flexible Rechargeable Lithium Ion Batteries: Advances and Challenges in Materials and Process Technologies" Journal of Materials Chemistry A2.28, 2014, 10712-738.

PCT International Search Report and Written Opinion, PCT Application No. PCT/IL2020/050581, Jul. 7, 2020, 11 pages.

PCT/IL2020/050581, Jul. 7, 2020, 11 pages.

Notification of Office Action and Search Report Dated Aug. 15, 2023 From the State Intellectual Property Office of the People's Republic of China Re. Application No. 202080053266.6 and Its Machine Translation Into English. (27 Pages).

Machine Translation Dated Feb. 20, 2024 of Notification of Office Action Dated Feb. 6, 2024 From the National Intellectual Property Administration of the People's Republic of China Re. Application No. 202080053266.6. (3 Pages).

Notification of Office Action Dated Feb. 6, 2024 From the National Intellectual Property Administration of the People's Republic of China Re. Application No. 202080053266.6. (4 Pages).

Translation Dated Sep. 7, 2023 of Notification of Office Action and Search Report Dated Aug. 15, 2023 From the State Intellectual Property Office of the People's Republic of China Re. Application No. 202080053266.6. (21 pages).

International Preliminary Report on Patentability Dated Sep. 30, 2021 From the International Preliminary Examining Authority Re. Application No. PCT/IL/2020/050581. (5 Pages).

International Search Report and the Written Opinion Dated Jul. 7, 2020 From the International Searching Authority Re. Application No. PCT/IL2020/050581. (11 Pages).

Hu et al. "Flexible Rechargeable Lithium Ion Batteries: Advances and Challenges in Materials and Process Technologies", Journal of Materials Chemistry A, 2(28):10712-10738, Aug. 30, 2022.

ELECTROCHEMICALLY PRODUCED THREE-DIMENSIONAL STRUCTURES FOR BATTERY ELECTRODES

FIELD OF THE INVENTION

The present invention relates to primary and secondary batteries comprising metal electrodes with engineered three-dimensional (3D) microstructures. The invention provides current collectors suitable for multiple battery chemistries, including lithium and non-lithium batteries, the collectors consisting of continuously electrodeposited 3D metal structures.

BACKGROUND OF THE INVENTION

Battery technologies in general and lithium-ion batteries in particular are a driving force for innovation in electrification of the transportation sectors, and for the desired decarbonization of energy. Lithium-ion batteries represent a commercially mature technology characterized by the highest energy density and specific energy practically available from batteries. Nonetheless, serious limitations exist, including the problems of uneven heat distribution and safety, accelerated degradation, limited lifetime, and others, as well as the problem of the imbalance between power and energy. These limitations are imposed by chemistry as well as the internal arrangement, porosity, thickness, and the structures of the electrodes. All commercial lithium-ion batteries are composed of layers of active materials (anode or cathode) on top of thin metal foils that serve as current collectors. The thinner these anode and cathode layers are (<50 um), the more power the battery can deliver; however, the energy density is significantly reduced due to the presence of additional weight of current collectors and the connecting tabs it needs. Much thicker (>70 um) electrodes allow significant increase in energy density but reduce battery power and operational lifetime. The latter is due to accelerated degradation as a result of mechanical stresses, electrochemical and thermal inhomogeneity across the electrodes. To mitigate these and other issues, thick electrodes can be fabricated inside highly porous and electrically conductive 3D frames. This approach has been implemented in the previous art. For example, U.S. Pat. Nos. 5,510,212, 6,605,390 and 9,178,217 disclose lithium ion batteries with their electrodes built inside carbon foams. Lithium-ion battery electrodes implemented in metal foams are also disclosed in U.S. Pat. Nos. 5,795,680, 6,346,343, 10,096,861 and US 2007/0248887 A1. Nonetheless, the existing foam manufacturing process is not optimized for battery performance, nor it is cost-effective, thus precluding the use of commercial foams for battery mass production. Other foam materials (like carbon or graphene of US 2017/0352868 A1) are not easily scalable and therefore cannot be cost-effectively used in battery mass production. It is therefore an object of this invention to provide batteries with at least one electrode embedded in metal frameworks fabricated by continuous electrochemical production of three-dimensional metal structures.

In addition, the existing methods for fabrication of 3D metal substrates are either expensive, non-scalable or both. Moreover, the metal structures produced during these processes are not tailored specifically for battery applications. It is therefore another object of this invention to provide cost-effective and highly scalable process for fabrication 3D metal current collectors for batteries. It is cost-effective and scalable because it uses relatively simple settings and the processes occurring at room temperature. For example, to produce large substrates the system and the electrode sizes can be increased accordingly with minimal capital investments.

It is yet another object of the present invention to provide a well-controlled method to fabricate 3D substrates with certain porosity, pore size, shapes and others characteristics that can be easily tailored for specific battery applications.

Other objects and advantages of the present invention will appear as the description proceeds.

SUMMARY OF THE INVENTION

The invention provides a continuous process for manufacturing electrical current collectors for primary and secondary batteries by electrochemical deposition, comprising i) providing a first roll (or any other type of stacking and folding means) and a second roll (or any other type of stacking and folding means) for winding a continuous electrically conductive substrate co-acting as a working electrode, wherein depending on polarity said working electrode can act as an anode or a cathode, wherein said substrate has first and second parallel sides, a first side whereat deposition or partial dissolution occur, thus if a first layer attached to said substrate at said first side is electrically conductive then it forms together with said substrate a working electrode, and if said first layer is not conductive then only said substrate serves as a working electrode, and a second side acting as a counter electrode to close a circuit; the thickness of said substrate being typically between 1 and 2000 μm, such as 1-1500 μm or 1-1000 μm, said first roll feeding said substrate and said second roll receiving said substrate; ii) feeding said substrate to a space between an anode and a cathode; iii) depositing or dissolving metal atoms on said first side of the substrate in accordance with electrical signals sent to said anode and said cathode by a central managing unit, thereby creating a continuous 3D electrode structure on said substrate; and iv) winding said 3D structure on said substrate onto said second roll; thereby obtaining 3D current collectors wound on a roll and ready for use upon being unrolled and/or cut to desired collector sizes. Alternatively, said 3D structure on the substrate can be stacked or folded. Said space between said anode and said cathode is filled with a first electrolyte. Other electrolytes may be located outside said working space. Said signals manage a parameter selected from potential between said anode and said cathode, electrical current at one of the electrodes, electrical power driving said current, or a combination thereof; said parameters usually vary according to pre-programmed values or course.

The process of the invention may employ a second electrolyte in which a section of said substrate may be immersed, outside said space between said anode and said cathode. Said metal atoms may comprise one or more of Zn, Ni, Co, Fe, Pb, Cr, Cu, Sn, Cd, Bi, Sb, Mn, Ag, Pt, Ir, or Au. Said metal atoms may also comprise one or more of W, Mo, V, Ga, or In. If said electrolytes are an aqueous electrolyte, anions may comprise chloride, sulfate, phosphate, pyrophosphate, sulfamate, cyanide, nitrate, and carboxylate. If said electrolytes are a non-aqueous electrolyte, said metal may comprise Mg, Al, Ti, or Ge, or other ion which cannot be deposited effectively from aqueous electrolytes. Said electrolytes may further comprise additives. The additives may comprise EDTA, citrates, other complexing agents, buffers, viscosity modifiers, conductivity modifiers, surface tension modifiers or acids selected from sulfuric, hydrochloric, nitric, and boric.

According to an embodiment of the invention, the electrochemical deposition most happens on the side oriented toward the counter electrode. In other words, the electrochemical deposition of metal atoms on the working electrode may occur when the substrate is oriented toward the counter electrode.

In another embodiment, the process of the invention may comprise a step of preforming a metal structure, for example in the form of foam or mesh, on said substrate, in which the pre-formed structure is later partially electrochemically dissolved in said space between said anode and cathode, wherein said first side is oriented toward said counter electrode, thereby changing the shape, porosity, thickness and/or composition of said structure.

The process of the invention includes rolling onto said second roll the substrate after the deposition of said metal atoms or after the dissolution of said metal atoms, thereby creating a continuous wound tape of an electrical collector.

The process may comprise a step of infiltrating said 3D electrode structure on the substrate with additional metal or nonmetal components. In some embodiments, the process of the invention comprises a step of drying at an elevated temperature, and/or a step of calendering to achieve specific thickness and porosity.

In one aspect of the invention, the electrical current collector manufactured as described may be combined with another electrode in a primary or secondary battery such as but not limited to NiCd, NiMH, NiFe, ZnNi, lead acid and metal-air batteries, and preferably rechargeable lithium and lithium ion batteries. Examples of lithium batteries include lithium-air, lithium sulphur, lithium solid state, and others. Examples of lithium-ion batteries include combinations comprising anodes such as graphite, silicon, and others, and cathodes such as LFP, NMC, or others. In one embodiment, two of electrical current collectors manufactured as described may be combined in a battery. Regarding the terms "anode" and "cathode", it is understood that the working electrode is a cathode during electro deposition, and an anode during electro dissolution.

The invention provides an apparatus for continuously manufacturing electrical current collectors for batteries by electrochemical deposition and/or partial dissolution, comprising i) a first electrode having an inner surface, and a second electrode having an inner surface, the inner surface of each of said first and second electrodes defining a working space therebetween; ii) a first roll for feeding a conductive substrate of a thickness ranging between 1 and 2000 µm, such as 1-1500 µm or 1-1000 µm, through said working space; iii) a second roll for receiving said substrate; iv) an electrolyte providing metal ions for deposition of said foil located in said working space; v) an electronic control unit, providing signals to said first and second electrodes to manage electrical current, potential, and power; the apparatus providing a roll of a wound current collector or any other similar stacking and folding machine, the collector having the form of an electrically conductive tape with a 3D metal structure created electrochemically on one or both of its sides, and capable of being cut to a desired size and shape. According to an embodiment of the invention, in order to deposit (or dissolve) structures on both side of the substrate, wherein in this embodiment the substrate is acting as a working electrode and it is sandwiched between two counter electrodes.

According to an embodiment of the invention, the first electrode is a working electrode and the second electrode is counter electrode, wherein the inner surfaces of said working and counter electrodes are oriented towards each other.

The apparatus of the invention may comprise additional rolls to assist in rolling the current collectors, their compressing, patterning, extruding, punching, or any combination thereof. The apparatus may comprise means for regulating the distance between said electrodes.

Said deposition or dissolution in the apparatus of the invention is effected via parameters selected from electrical current, potential, power, and a combination thereof, wherein the polarity of the electrodes may be reversed.

The invention relates to an electrical current collector having the form of a continuous electrically conductive substrate tape having a certain width and a thickness, the substrate having a metal 3D structure on one or both of its sides created by electrochemical deposition and/or dissolution, and the tape being wound on a roll or stacked and folded and configured to be cut to a desired length. The thickness of the electrically conductive substrate is preferably between 1 µm and 1000 µm, and its width is up to 1000 mm. Said 3D structure may have a height of up to 10 mm.

The invention relates to a primary or secondary battery comprising an electrical current collector produced from a continuous conductive substrate tape wound on a roll or stacked and folded, the substrate having a thickness of 1-1000 µm, the tape having a width of up to 1000 mm, the tape comprising a 3D structure electrochemically created on one of the foil to a height of up to 10 mm, such as up to 5 mm, for example up to 1000 µm or up to 200 µm or up to 100 µm. The battery may have a layered structure including the described electrical current collector and a separator. The battery may comprise two electrical current collectors according to the invention as described above. The battery of the invention may comprise an ionically conductive separator, a porous membrane soaked with electrolyte, a polymer or solid state conductor, a conventional cathode deposited on a foil, or a combination thereof.

The specific lithium-ion battery of the invention usually retains at least 90% of the initial capacity after 400 successive charge/discharge cycles at C/3 rate.

BRIEF DESCRIPTION OF THE DRAWINGS

The above and other characteristics and advantages of the invention will be more readily apparent through the following examples, and with reference to the appended drawings, wherein:

FIG. 6B depicts a configuration in which cathode (11), fabricated according to the processes of the invention, is combined with a conventional anode, and FIG. 6C depicts a battery configuration where both anode and cathode current collectors were fabricated according to the processes of the invention;

DETAILED DESCRIPTION OF THE INVENTION

It has now been found that a continuous tape of a conductive foil with an electrochemically deposited 3D structure on one side of said foil can be cut to obtain electrical current collectors providing an excellent performance when integrated into a lithium-ion battery.

Figure 1:
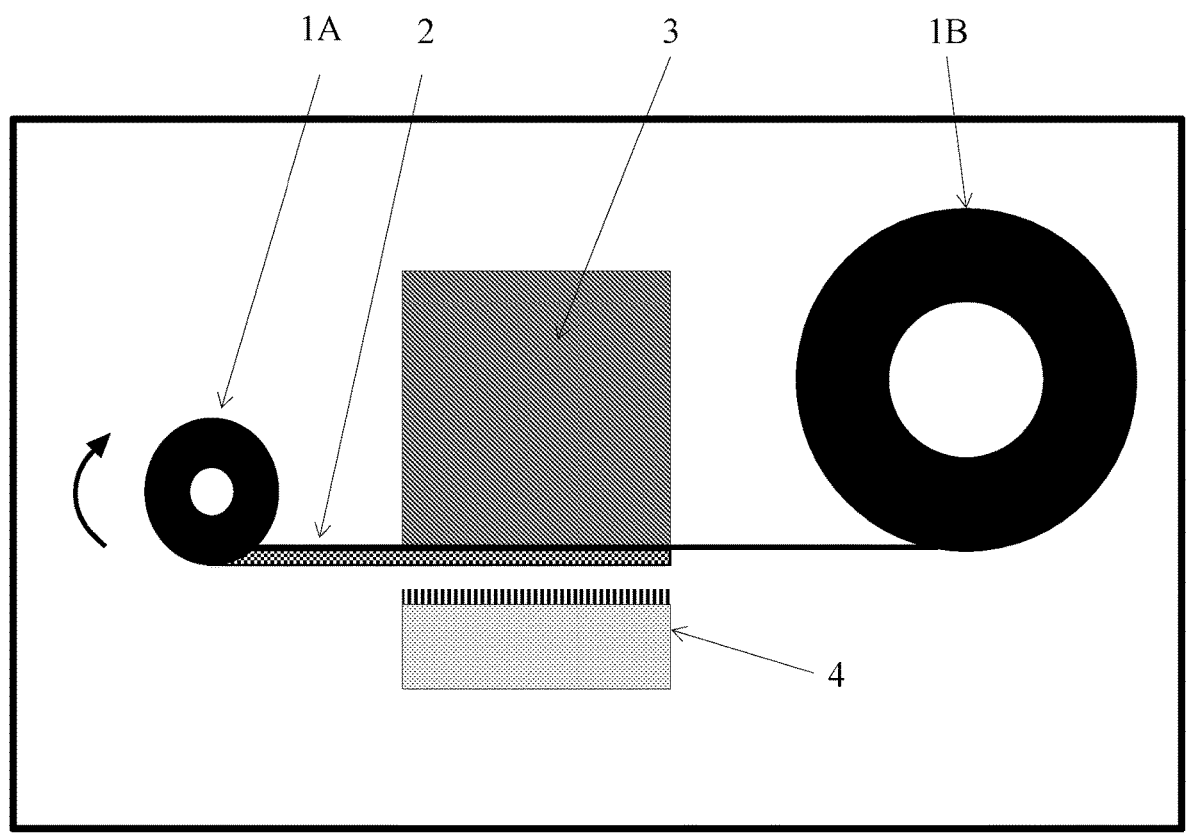
FIG. 1 is a schematic illustration of the system and the process for producing current collectors according to the invention in a continuous way; rolls (1A and 1B) feed, stack, or fold conductive substrate tape (2) that is in electrical contact with a primary working electrode (3) thus serving as a combined working electrode and is positioned against a primary counter electrode (4)
Figure 2A:
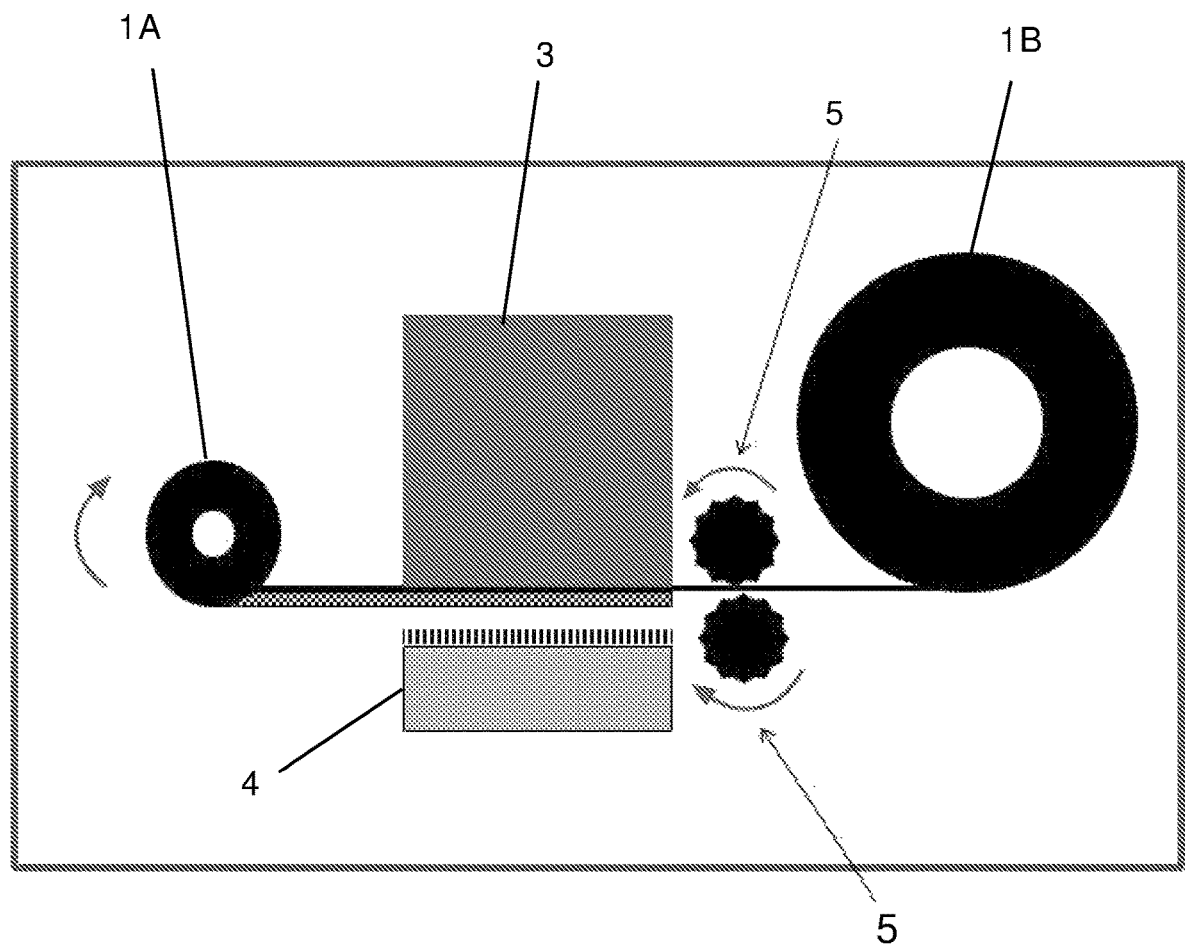
FIG. 2A depicts the system according to FIG. 1, further comprising specialized rollers (5)
Figure 2B:
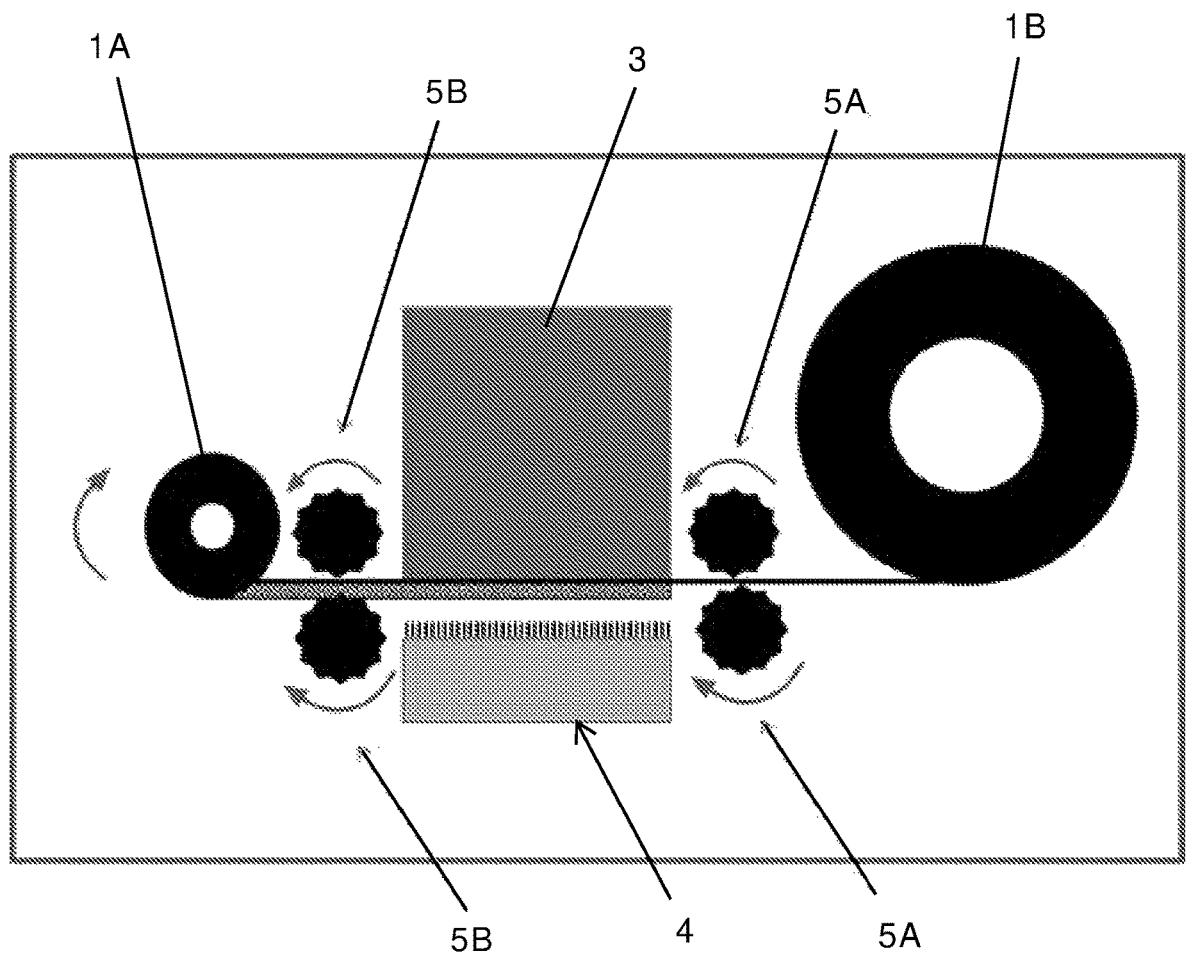
FIG. 2B depicts the system according to FIG. 1, further comprising specialized rollers (5A) and (5B)

The invention provides batteries with 3D current collectors and the method of producing them by a continuous electrochemical deposition or dissolution process. The process of producing current collectors in a continuous way is indicated by FIG. 1 and FIGS. 2A-2B. A roll (1B) or any other means of packing an electrically conductive substrate, including, but not limited to, thin metal foil (2) with thickness in the range of 1-1000 µm is fed to the device where the metal is electrochemically deposited within a volume containing an electrolyte between a layer that represents a primary working electrode (3) and a primary counter electrode (4) that may be a made of metal, carbon or conductive composite. The volume containing the electrolyte between working and counter electrode may be referred to as the "working space", and the surface of each of the primary working electrode (3) and primary counter electrode (4) which is closest to the working space may be referred to as the "inner surface". The block of primary counter electrode (4) may further be patterned with arrays of microelectrodes each of which is able to be controlled individually, in groups or in whole. The deposited film is rolled onto the other roll (1A). The electrochemical deposition on substrate (2) to create a continuous 3D secondary electrode structure occurs when the potential of primary working electrode (3) is more negative then primary counter electrode (4) and is regulated by an external device such as a power supply or potentiostat. The control of the deposition or dissolution can be effected via electrical current, potential, power, or a combination thereof. The current, the power, or the combination thereof can be constant or can vary according to pre-programmed values.

The inner surface of primary working electrode (3) and of primary counter electrode (4) may be mutually parallel in order to achieve a substantially uniform deposition or dissolution rate. Alternatively, the inner surface of each of primary working electrode (3) and of primary counter electrode (4) are not necessarily mutually parallel if the distance therebetween is an order of magnitude larger than the size of the 3D structures being produced on the substrate. For example, if the thickness of the 3D structures is only 100 µm, the distance between primary working electrode (3) and of primary counter electrode (4) will be at least 1 mm. Similarly the distance between primary working electrode (3) and of primary counter electrode (4) will be at least 1 cm if the thickness of the 3D structures is 1 mm. The inner surface of primary working electrode (3) may have an essentially rectangular, circular or any other shape, and the inner surface of primary counter electrode (4) may have an essentially rectangular, circular or any other shape.

According to an embodiment of the invention, a working electrode can be defined as the area of substrate (fed from the roller 1B) under layer (3). These two are in electrical contact if layer (3) is made of conducting material and connected to a power supply. If layer (3) is not made of a conductive material then it is not part of a working electrode. In such case, the power supply can be connected to the substrate directly. There is ion-conducting electrolyte between substrates attached to layer (3) and the primary counter electrode (4). Primary counter electrode (4) is never electrically connected to the substrate fed from roller 1B to roller 1A.

Figure 1A:
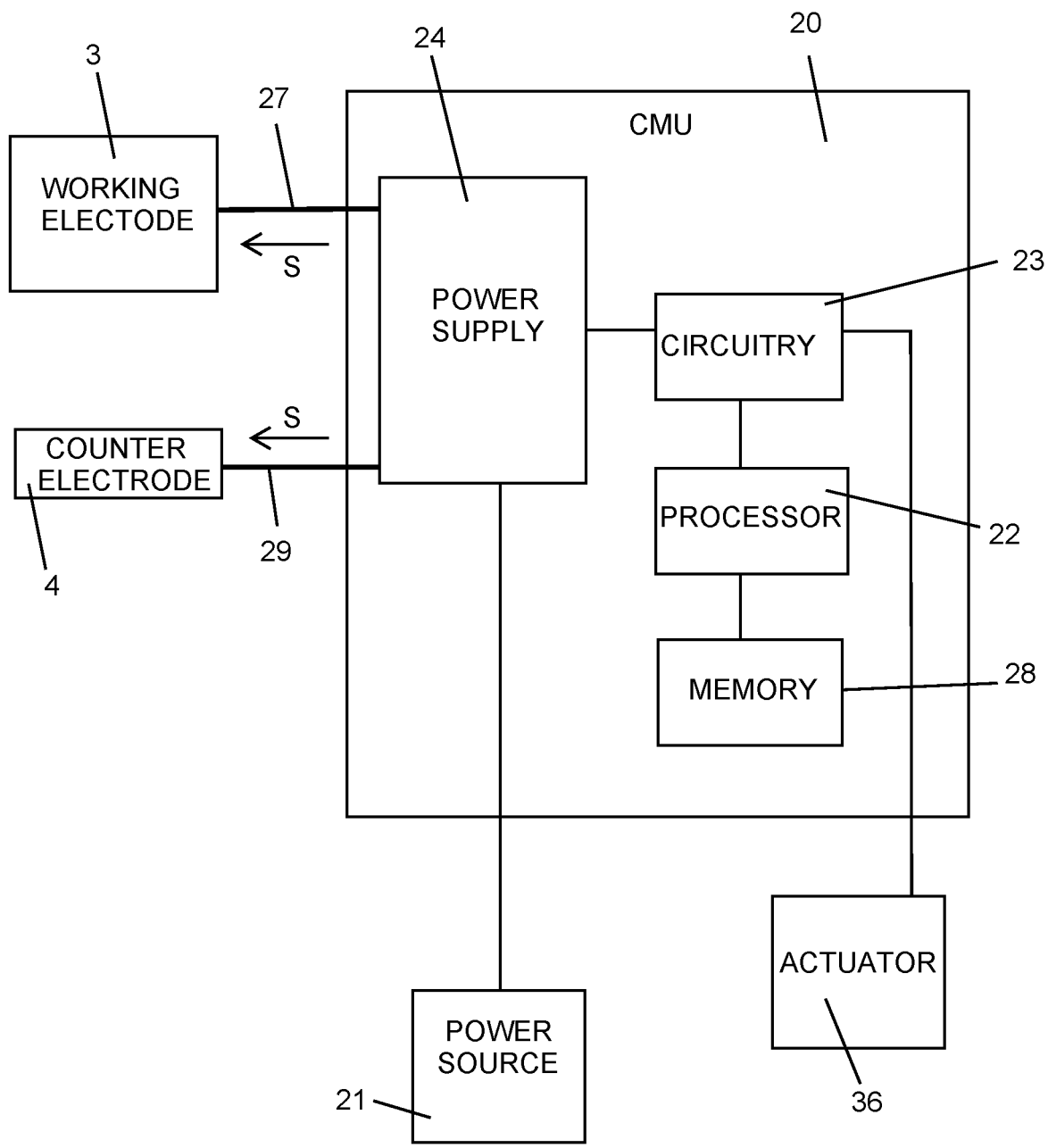
FIG. 1A is a schematic illustration of a central managing unit (20) adapted to command regulation of electrical power supplied to the primary working electrode (3) and primary counter electrode (4) of FIG. 1.

Exemplary electronic hardware for controlling the electrochemical deposition or dissolution process is schematically illustrated in FIG. 1A wherein a central managing unit (CMU) (20) comprising a processor (22) which, together with circuitry (23), controls a power supply (24) adapted to feed electrical power from a power source (21) such as utility power to primary working electrode (3) and primary counter electrode (4) by cables (27) and (29), respectively, is responsible for regulating one or more of the electrical parameters selected from current, voltage and power flowing through a single or a group of electrodes that can be negative (deposition), positive (dissolution) or zero (no current). The values for the current together with the relative position and the number of electrodes are stored in memory device (28). In some basic embodiments, the CMU (20) commands only activation and deactivation of power supply (24) to ON and OFF settings, respectively, so that a predetermined value of current, voltage or power will be delivered when the power supply is activated. In some embodiments, the CMU (20) regulates operation of power supply (24) through command signals (S), so that a varying value of current, voltage or power in accordance with instructions stored in memory device (28) will be delivered when the power supply is activated. CMU (20) is also operable to command operation of an actuator (36) needed to increase efficiency of the deposition or dissolution process.

When primary working electrode (3) and primary counter electrode (4) are submerged in an ionically conductive electrolyte, current will be able to flow between the two primary electrodes to close the circuit.

Primary working electrode (3) and primary counter electrode (4) are able to co-act together with two corresponding additional layers, respectively, of substrate (2) to produce a combined working electrode and a combined counter electrode, respectively. Depending on the polarity of the electrical potential, the combined working electrode may function as the cathode and the combined counter electrode may function as the anode, or alternatively the combined working electrode may function as the anode and the combined counter electrode may function as the cathode. In some embodiments, substrate (2) may be configured with only one additional layer.

When a first layer, for example, of substrate (2) is made of electrically conductive material such as metal or carbon, the secondary electrode layer will be electrically connected to both substrate (2) and primary working electrode (3) to function together as the combined working electrode. When the first layer is made of electrically insulating material, only primary working electrode (3) functions as the working electrode.

The distance between primary working electrode (3) and primary counter electrode (4) can vary and partially deposited film can be also pulled out of the electrolyte solution. The pulling rate can be between 0.5 and 1000 μm per min.

Figure 1B:
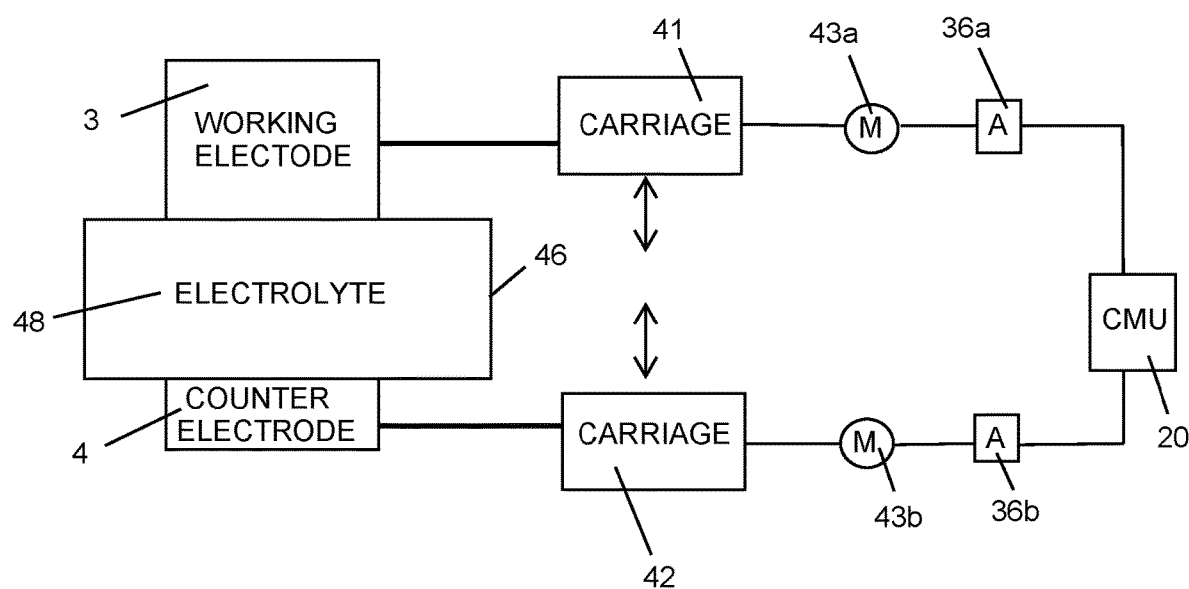
FIG. 1B is a schematic illustration of linear displacement means (41) and (42) adapted to independently displace the primary working electrode (3) and primary counter electrode (4), respectively, of FIG. 1.

As shown in FIG. 1B, each of primary working electrode (3) and primary counter electrode (4) is linearly and independently displaceable by carriages (41) and (42), respectively, or by other linear displacement means well known to those skilled in the art, with respect to working space (46) containing the electrolyte (48), in order to control the distance between the two primary electrodes. Motors (43a) and (43b) are adapted to differentially drive carriages (41) and (42), respectively, at a predetermined rate when commanded by CMU (20) in conjunction with actuators (36a) and (36b), respectively. The slowest rate of linear displacement is between 0.1-1 μm/min.

In one implementation, carriage (41) slowly pulls primary working electrode (3) out of electrolyte (48) when 3D structures (26) are being deposited on substrate (2), to ensure that the distance between the combined working electrode, which includes the secondary electrode layer bonded to substrate (2), and primary counter electrode (4) remains substantially constant to prevent an inhomogenities in current distribution and resulting uneven deposition on the primary working electrodes.

In another implementation, carriage (41) is slowly displaced to cause primary working electrode (3) to be increasingly immersed within an electrolyte (48) solution when material is being dissolved from the secondary electrode layer bonded to substrate (2), to ensure that the distance between the combined working electrode and primary counter electrode (4) remains substantially constant.

Metals and alloys that can be deposited from aqueous solutions may comprise Zn, Ni, Co, Fe, Pb, Cr, Cu, Sn, Cd, Bi, Sb, Mn, Ag, and noble metals like Pt, Ir, Au, or others. Additional metals can be doped with the deposited metals, such as W, Mo, V, Ga, In, and others. When non aqueous electrolytes are used, such as ionic liquids, other metals and alloys can be deposited such as Mg, Al, Ti, Ge, and others, which cannot be deposited effectively from aqueous electrolytes. Aqueous electrolytes usually contain metal salts when the salt anion may comprise chloride, sulfate, phosphate, pyrophosphate, sulfamate, cyanide, nitrate, carboxylate, and other organic and inorganic ions. Various additives and complexing agents can be used, such as EDTA, citrates, and others. The pH of the aqueous electrolytes are regulated by adding buffers, comprising organic or inorganic components; the employed acids may include but are not limited to sulfuric, hydrochloric, nitric, boric, and others.

Three-dimensional current collectors can also be produced continuously by electrochemical dissolution of foam, mesh and similar substrates with typical thickness of between 50-5000 μm. The roll (1B) of a material is fed into the device (e.g., as shown in FIG. 1). The electrochemical dissolution occurs when the potential of primary working electrode (3) is more positive then primary counter electrode (4), and is regulated by the external device such as power supply or potentiostat. The control of dissolution can be effected via current, potential, power, or a combination thereof. The current, the power or the combination thereof can be constant or can vary according to pre-programmed values. The partially dissolved film is rolled on the other roller (1A).

Figure 4:
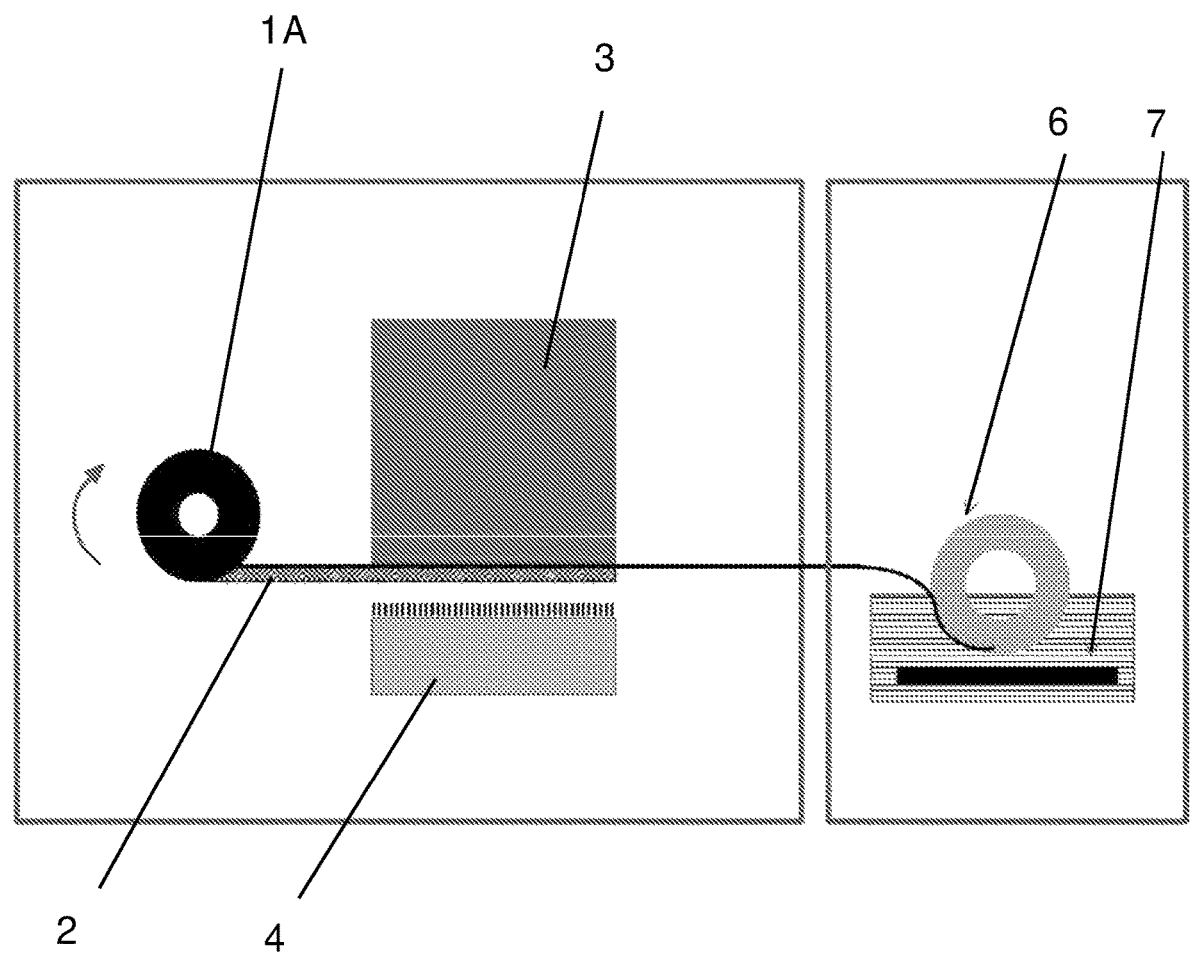
FIG. 4 schematically depicts the system and the process according to another embodiment of the invention, in which roll 1B of FIG. 1 is replaced with an additional electronically conductive module fully or partially immersed in an electrolyte containing ions of desired metal or alloys, continuously producing thin films on a working electrode (6) placed opposite to a counter electrode (7)

The roll (1B) in the system according to FIG. 1 can be replaced with an additional module that produces thin films continuously. The roll (6) of FIG. 4 is made of graphite, carbon, conductive polymer, titanium or any other stable and electronically conductive material, and it is fully or partially immersed into an electrolyte containing ions of desired metal or alloys. A negative voltage or current is applied on this roll versus a counter electrode (7) that is fully or partially immersed into the solution (potential of the electrode on the roll (6) is always lower than that of a counter electrode roll connected to a negative terminal of an additional power supply while the counter electrode (7) is connected to a positive terminal of the additional power supply). The roll (6) slowly rotates and the deposited film detaches from the roll. This film is then fed into the system of FIG. 1. It is important to emphasize that the embodiment of FIG. 1 is using already produced substrate in a form of tape/film/mesh/foam that is rolled or stacked. On the other hand, the embodiment of FIG. 4, first produces metal substrate, either dense film or porous mesh, that then is used for deposition or dissolution.

In addition, for all configurations of the system, an additional component of specialized rollers (5) may be introduced in the system as shown in FIG. 2A, or alternatively two sets of rollers (5A) and (5B) shown in FIG. 2B may be employed. These rollers may be added at any point of the rolling line in order to apply a mechanical force to the substrate. They can serve the purpose of performing any of the operations of compressing, rolling, patterning, extruding, embossing, imprinting and punching the current collectors, and in any combination thereof.

The substrate is able to be conditioned by rollers (5A) and (5B) of FIG. 2B according to one of three different configurations:
1. The substrate is fed between rollers (5A) prior to initiation of an electrochemical process (deposition or dissolution).
2. The substrate undergoes the electrochemical process and is then fed between the rollers (5B) for mechanical processing.
3. The substrate is fed to rollers (5A), undergoes the electrochemical process, and is then fed to the next set of rollers (5B).

Figure 3:
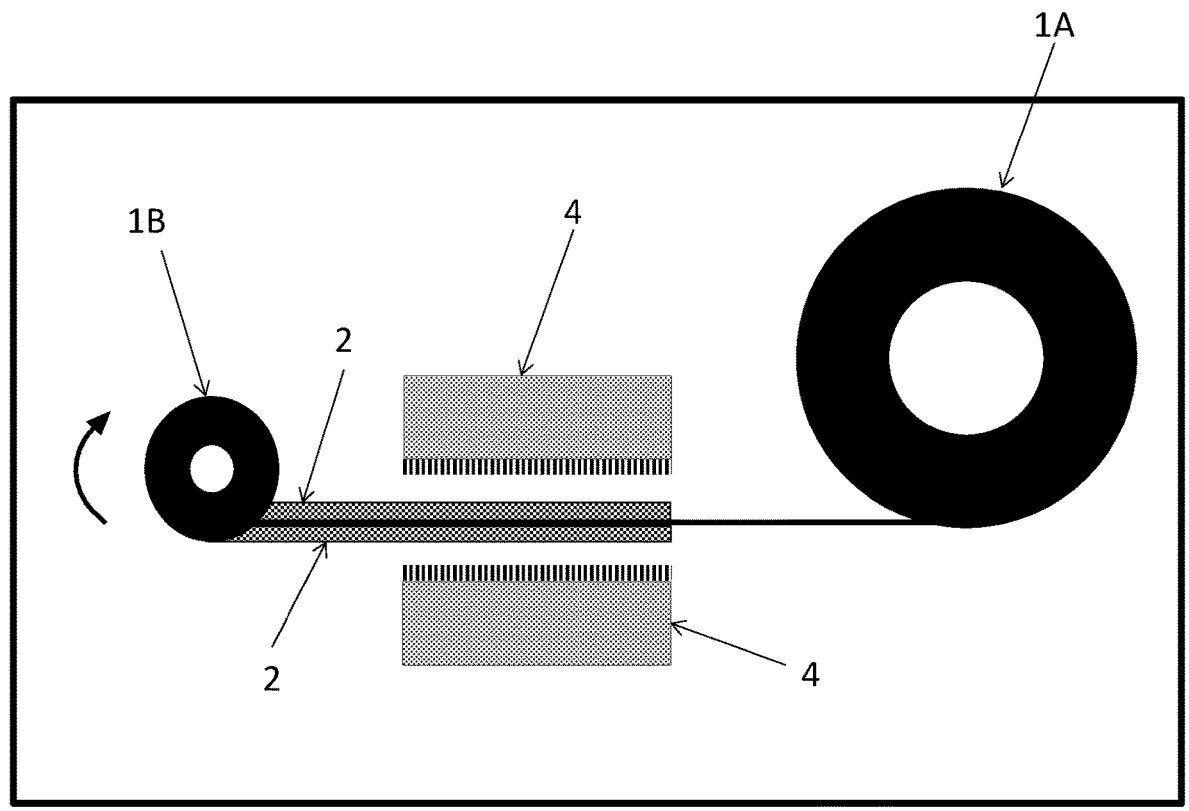
FIG. 3 shows another modification of the system according to FIG. 1, in which counter electrodes are electrically connected together, thus deposition dissolution can occur on both sides.

According to an embodiment of the invention, deposition dissolution can occur on both sides. In such case two counter electrodes 4 are electrically connected together, as shown in FIG. 3.

The system for producing three-dimensional current collector films can also be assembled from any practical combination of systems in FIG. 1 to FIG. 4.

Figure 5A:
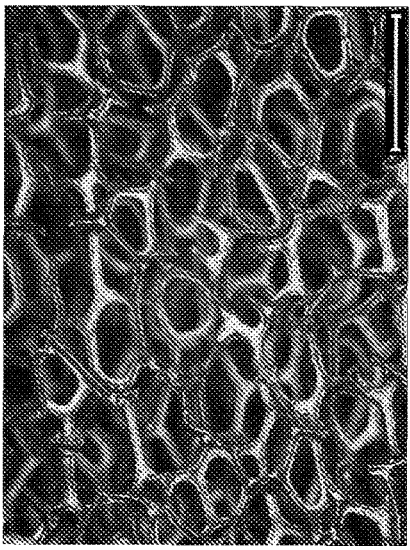
FIGS. 5A-F are six optical microscope and SEM images, respectively, of the 3D current collectors produced in accordance with embodiments of the invention, wherein a 3D current collector made of copper is shown in the image of FIG. 5A that covers an area of about 3000 µm in length, a current collector infiltrated with graphite material that serves as an anode in lithium-ion batteries is shown in the image of FIG. 5B that covers about 55 µm in length, a cross-sectional area of an electrode after calendering and before being assembled into a battery cell is shown in the image of FIG. 5C that covers an area of about 550 µm in length, and a 3D copper metal electrode fabricated with a hierarchical pore structure is shown in the image of FIG. 5F.
Figure 5B:
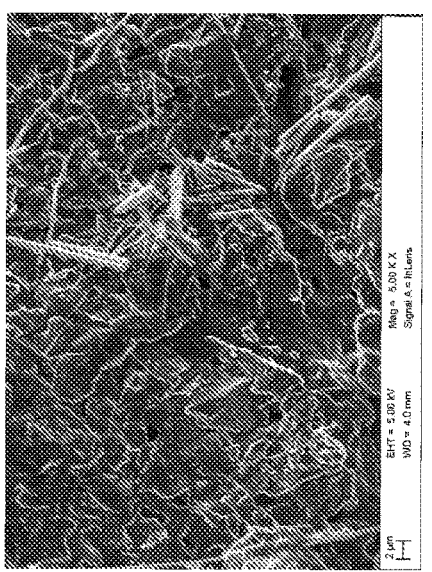
Figure 5C:
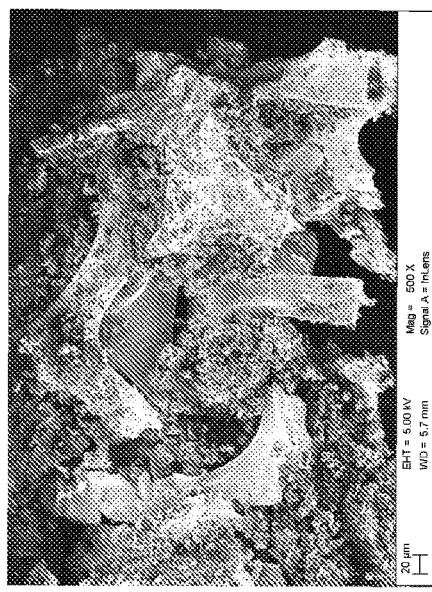

The produced 3D current collectors can be infiltrated with electrode material paste, dried at an elevated temperature, and calendered to achieve specific thickness and porosity. Electrodes made in this way can be cut and assembled into the batteries. An example of such battery electrode is depicted in FIG. 5. FIG. 5A is an optical microscope photo (covering about 3000 jam) showing 3D current collectors made of copper and produced by the processes described in FIG. 1 to FIG. 3. FIG. 5B is an electron microscope image (covering about 55 µm) showing 3D current collectors infiltrated with graphite material that serves as an anode in lithium-ion batteries. FIG. 5C is an electron microscope image (covering about 550 µm) showing the cross-sectional area of this electrode after calendering and before the assembly into the battery cell.

Figure 5D:
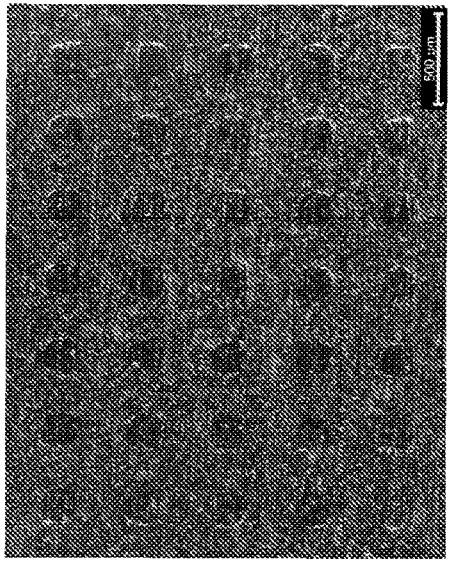
Figure 5E:
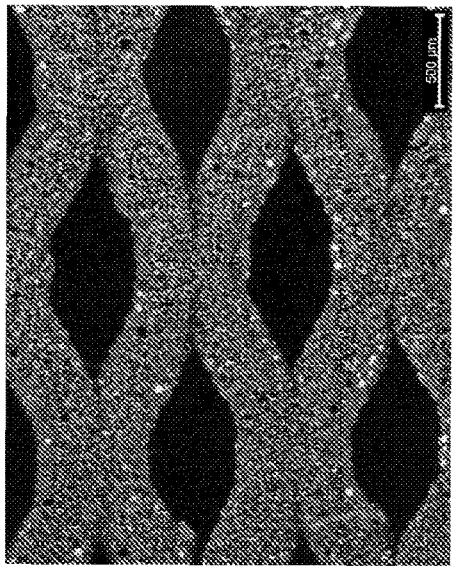
Figure 5F:
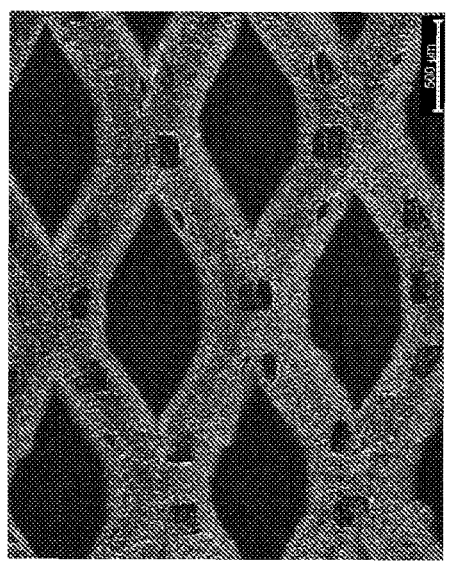

FIGS. 5D, 5E and 5F are an optical microscope image of three different 3D copper metal electrodes which were produced after a thin copper sheet was fed through roll (6) of FIG. 4 and then fed into the specialized rollers (5B) of FIG. 2B to fabricate the 3D substrate. In the image of FIG. 5F, for example, hierarchical pore structures are fabricated.

Figures 6A, 6B, 6C:
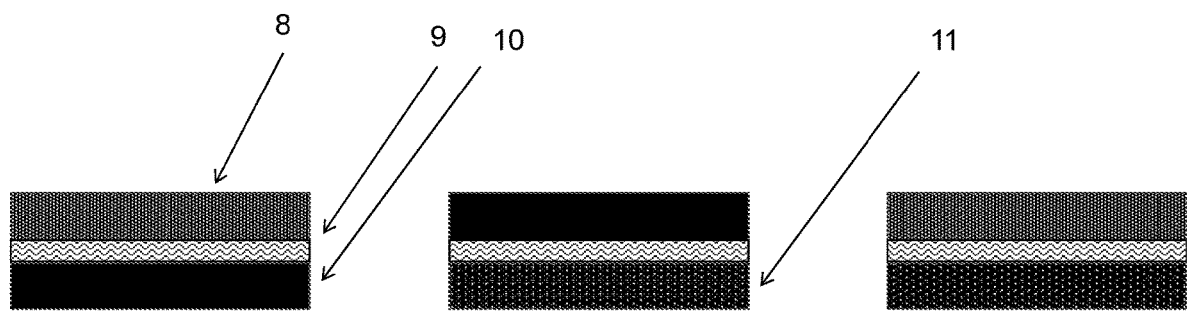
FIG. 6A-C are three schematic illustrations, respectively, of a layered electrode structure produced in accordance with embodiments of the invention, wherein FIG. 6A demonstrates a configuration comprising anode (8), being an infiltrated 3D electrode manufactured according to the process of the invention and separated from a conventional cathode with an ionically conductive separator (9)

The batteries can be assembled in different configurations. The electrodes and the current collectors may comprise layered graded structures whose porosity, current collector structure, or composition of the metal framework or active material can be adjusted in all three dimensions, or they may be kept constant using the systems shown in FIG. 1 to FIG. 5. FIG. 6A demonstrates a configuration comprising anode (8), being an infiltrated 3D electrode manufactured according to the process of FIG. 1 to FIG. 4, an ionically conductive separator (9), such as a porous membrane soaked with electrolyte, polymer or solid state conductor, and a conventional cathode (10) deposited on a foil. FIG. 6B depicts a configuration where the cathode (11) current collector was fabricated according to the processes showed in FIG. 1 to FIG. 3, and the anode may be a conventional anode. FIG. 6C depicts a battery configuration where both anode and cathode current collectors were fabricated according to the processes showed in FIG. 1 to FIG. 3.

Figure 7:
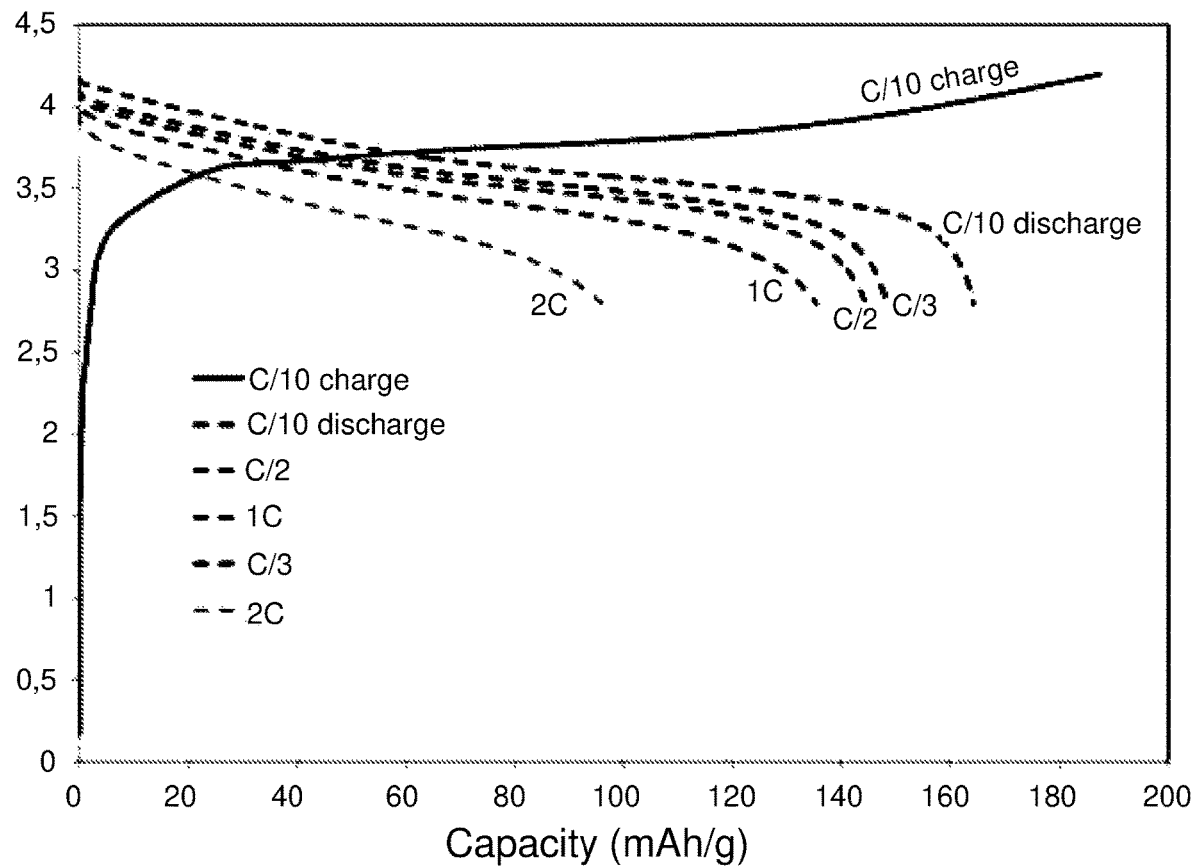
FIG. 7 shows an example of charge and discharge courses at different C-rates of a lithium-ion battery of 2 cm² active area built with graphite and lithium nickel manganese cobalt dioxide (NMC) cathode comprising electrodes of the invention.
Figure 8:
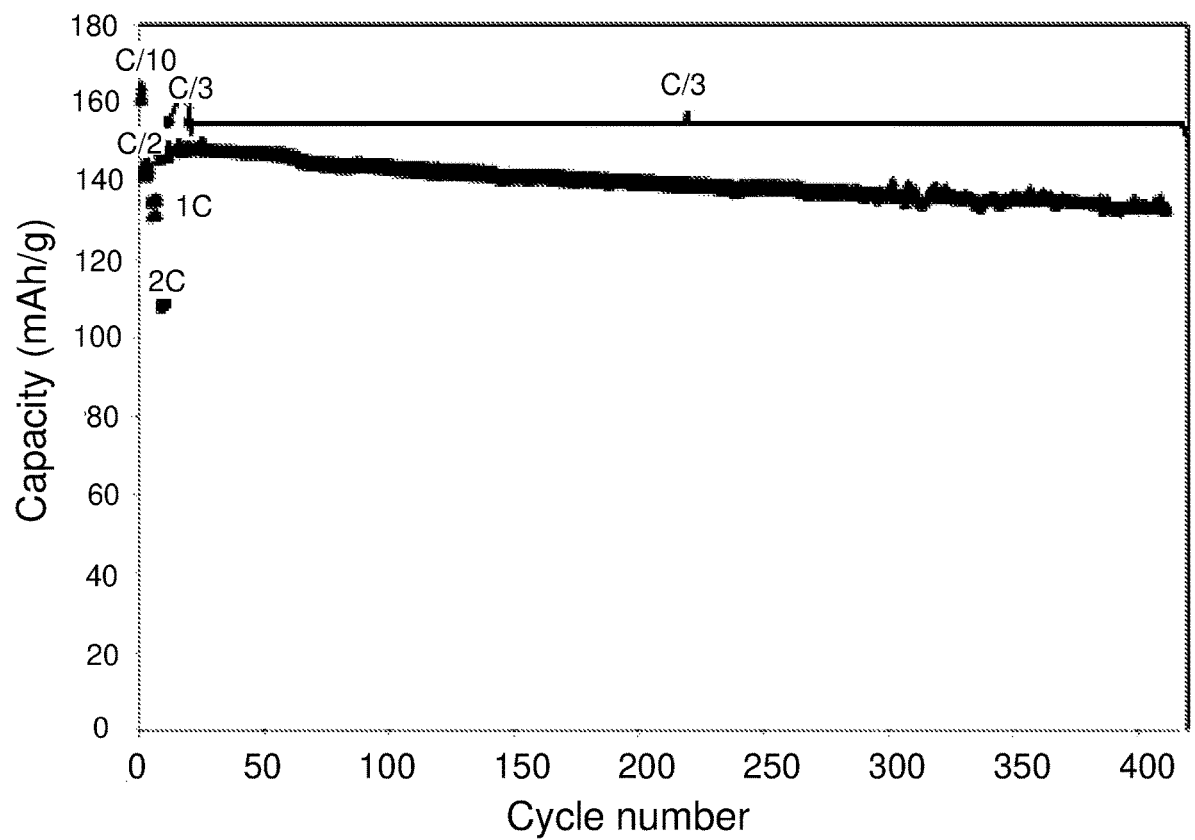
FIG. 8 shows the cell performance of the battery characterized in FIG. 7; over more than 400 successive charge/discharge cycles at C/3 rate, were performed.
Figure 10:
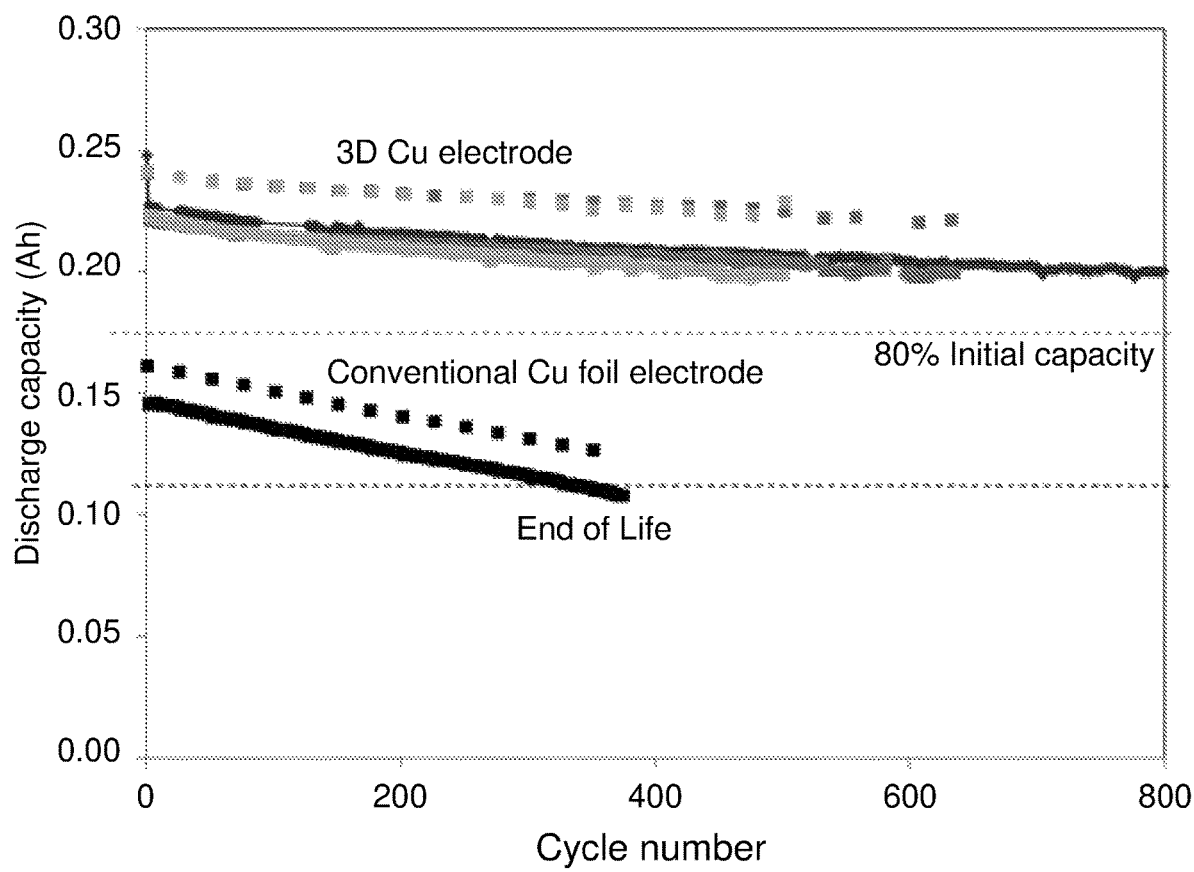
FIG. 10 shows the cycle life of the pouch cell with 3D copper current collector as compared to the cell with a regular electrode on thin copper foil current collector.

An example of charge and discharge at different rates of a battery with active area of 2 cm$^2$ according to FIG. 5 is shown in FIG. 7. The thickness of a graphite anode with a 3D current collector made of copper was 600 micron. The cathode was lithium nickel manganese cobalt oxide or NMC and the electrolyte was based on EC, DMC solvents and LiPF$_6$ salt. The thick electrode retained 70% of its reversible capacity when discharge at 2 C rate versus 0.5 C. The cell performance of the battery is depicted in FIG. 8. Over more than 400 successive charge/discharge cycles at C/3 rate, the cell capacity degraded less than 10%. FIG. 10 indicates a battery running for more than 800 cycles at C/3 rate with 90% capacity retained.

Figures 9A, 9B, 9C:
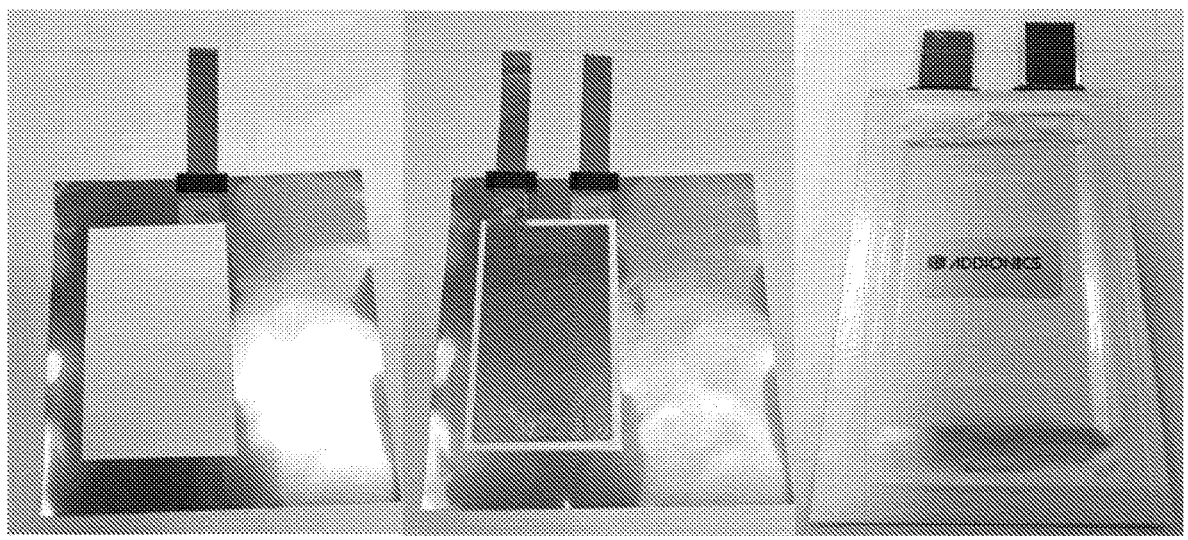
FIG. 9 shows assembly of the pouch cell with 60 cm² active area; (A) anode, (B) anode, cathode and separator, and (C) fully assembled pouch cell.

An example of assembly of a larger cell with 60 cm$^2$ active area is depicted in FIG. 9. First, a 3D copper current collector is prepared (FIG. 9A), followed by preparation of the thick NMC cathode on foil and placing it with a microporous separator before filling the cell with the electrolyte (FIG. 9B). The final assembled cell with the electrolyte (i.e., a pouch cell) is depicted in FIG. 9C. The term pouch cell refers herein to a casing or enclosure made of laminated metal (commonly aluminum) pouch that holds inside battery electrodes, as best seen in FIG. 9C.

The performance of the 3D copper current collector pouch cell is compared with that of a conventional cell made with both electrodes on thin films (FIG. 10). The capacity of the former one is remarkably stable over charge and discharge cycles at C/3 in comparison to the conventional cell. Moreover, the cell with 3D copper current collector (CC) has better capacity utilization due to its high porosity.

Figure 11:
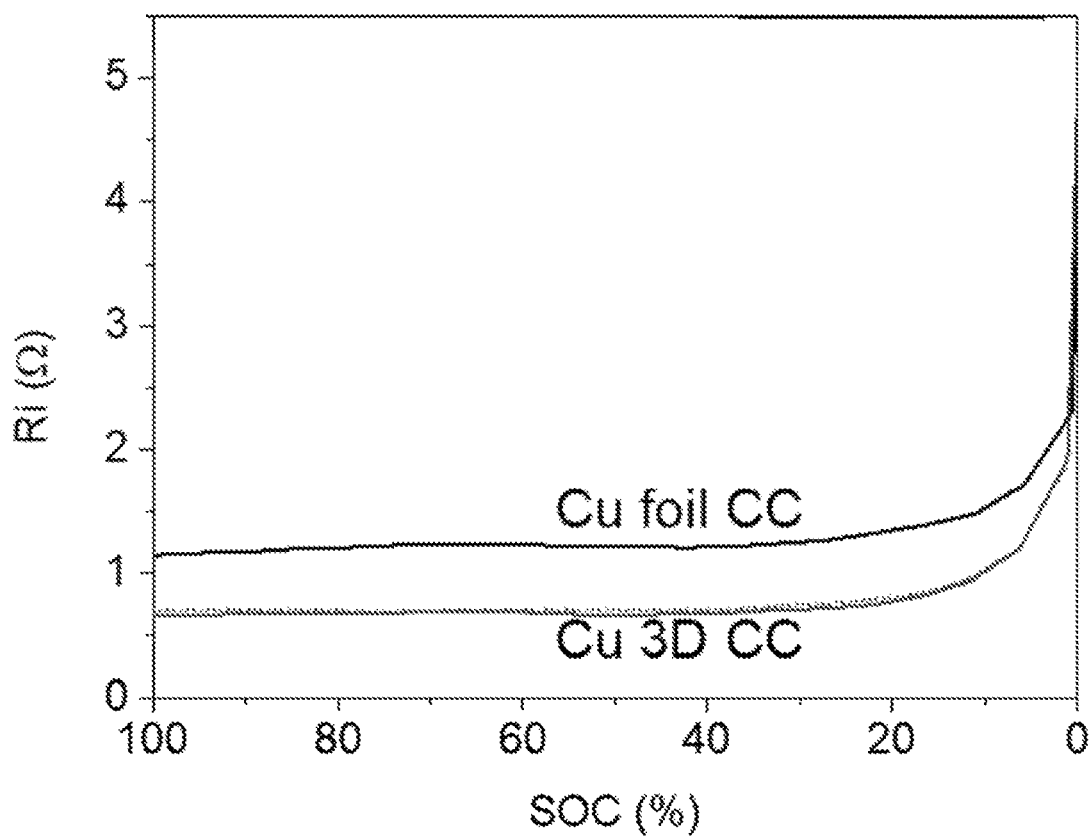
FIG. 11 shows significantly lower internal resistance of the cell with 3D copper current collector as compared to the cell with a regular electrode on thin copper foil current collector.

The comparison of internal resistance of the two cells is depicted by FIG. 11. It was measured across the whole range of state-of-charge (SOC) of the batteries at 30 s short current pulses. It is clear that the resistance of the cell with 3D copper CC is considerably lower across the whole range of SOC. This demonstrates a potential of batteries with 3D current collectors for high power applications.

While the invention has been described using some specific examples, many modifications and variations are possible. It is therefore understood that the invention is not intended to be limited in any way, other than by the scope of the appended claims.

The invention claimed is:

1. A continuous process for manufacturing electrical current collectors, comprising
    i) providing a first roll and a second roll for winding a continuous electrically conductive substrate foil having first and second parallel sides;
    ii) feeding said substrate to a space between an anode and a cathode, wherein said first side is capable of co-acting as a combined working electrode together with one of said anode and cathode, and a second side capable of co-acting as a combined counter electrode together with the other one of said anode and cathode to close a circuit;
    iii) electrochemically depositing metal atoms on a first layer, electrochemically dissolving metal atoms from the first layer, or both, the first layer bondable to said first substrate side in accordance with electrical signals sent to said anode and said cathode by a central managing unit, thereby creating a continuous 3D electrode structure comprising said metal atoms on said substrate; and
    iv) winding said 3D structure on said substrate onto said second roll,
    thereby obtaining 3D current collectors.

2. The process of claim 1, wherein said space between said anode and said cathode is filled with a first electrolyte.

3. The process of claim 1, wherein said signals manage a parameter selected from potential between said anode and said cathode, electrical current at one of the anode and cathode, electrical power driving said current, or a combination thereof.

4. The process of claim 1, wherein a section of said substrate outside said space between said anode and said cathode is immersed in a second electrolyte.

5. The process of claim 1, wherein said metal atoms comprise one or more of Zn, Ni, Co, Fe, Pb, Cr, Cu, Sn, Cd, Bi, Sb, Mn, Ag, Pt, Ir, or Au.

6. The process of claim 1, wherein said metal atoms comprise one or more of W, Mo, V, Ga, or In.

7. The process of claim 1, wherein said first electrolyte is an aqueous electrolyte, comprising anions selected from chloride, sulfate, phosphate, pyrophosphate, sulfamate, cyanide, nitrate, and carboxylate.

8. The process of claim 1, wherein said first electrolyte is a non-aqueous electrolyte, and said metal atoms comprise Mg, Al, Ti, or Ge, or other ion which cannot be deposited effectively from aqueous electrolytes.

9. The process of claim 4, wherein said first or second electrolyte further comprises additives selected from ethylenediaminetetraacetic acid, citrates, other complexing agents, buffers, viscosity modifiers, conductivity modifiers, or acids selected from sulfuric acid, hydrochloric acid, nitric acid, and boric acid.

10. The process of claim 1, wherein said first side is oriented toward said anode and said second side toward said cathode, the process comprising electrochemical deposition of metal atoms on said first side.

11. The process of claim 1, comprising a step of preforming a metal foam or mesh on said substrate.

12. The process of claim 11, wherein said first side is oriented toward said cathode, comprising electrochemical dissolution, in said space between said anode and cathode, of metal atoms from said foam or mesh.

13. The process of claim 11 comprising rolling the substrate onto said second roll after the deposition of said metal atoms or after the dissolution of said metal atoms.

14. The process of claim 1, further comprising infiltrating said 3D electrode structure on the substrate with additional metal or nonmetal components.

15. The process of claim 14, comprising steps of drying at an elevated temperature, and/or calendering to achieve specific thickness and porosity.

16. The process of claim 1, further comprising combining at least one of said electrical current collectors with another electrode in a lithium battery.

17. The process of claim 1, wherein the substrate foil comprises a metal foil, and wherein step iii) comprises electrochemically depositing said metal atoms on the first layer thereof, thereby creating the continuous 3D electrode structure comprising said metal atoms on said metal foil.

18. The process of claim 1, wherein step iii) comprises electrochemically dissolving the metal atoms from the first layer.

* * * * *